United States Patent

[11] 3,576,540

[72] Inventors Donald G. Fair
   Belvidere;
   Harold L Baeverstad, Rockford; Carl F.
   Erikson, Belvidere, Ill.
[21] Appl. No. 684,235
[22] Filed Nov. 20, 1967
[45] Patented Apr. 27, 1971
[73] Assignee Sundstrand Corporation

[54] PLURAL MACHINE TOOL AND PART HANDLING CONTROL SYSTEM
   18 Claims, 14 Drawing Figs.
[52] U.S. Cl. .................................................. 340/172.5,
   235/151.11, 318/562
[51] Int. Cl. .................................................. G06f 9/00,
   G06k 17/00
[50] Field of Search .......................................... 235/151.11;
   340/213; 214/11; 104/88; 318/20.13; 235/157;
   340/147; 340/172.5

[56] References Cited
   UNITED STATES PATENTS
| | | | |
|---|---|---|---|
| 3,313,014 | 4/1967 | Lemelson ..................... | 29/33 |
| 3,465,298 | 9/1969 | La Duke et al. .............. | 340/172.5 |
| 3,145,291 | 8/1964 | Brainerd....................... | 104/88X |
| 3,260,349 | 7/1966 | Vander Meer ............... | 340/172.5X |
| 3,269,233 | 8/1966 | Lothmann..................... | 235/151.1X |
| 3,372,568 | 3/1968 | Lemelson..................... | 214/11X |

Primary Examiner—Paul J. Henson
Assistant Examiner—Melvin B. Chapnick
Attorney—Hofgren, Wegner, Allen, Stellman & McCord ABSTRACT: A digital computer simultaneously controls the operation of plural machine tools and related apparatus, and coordinates the movement of parts and tools between storage areas and each of the machine tools. The parts which are to be worked on are either randomly or selectively supplied to any particular machine tool. Tools used in common by the machine tools are stored in a central storage area, and are selectively conveyed to a particular machine tool in accordance with the operations to be performed on a part.

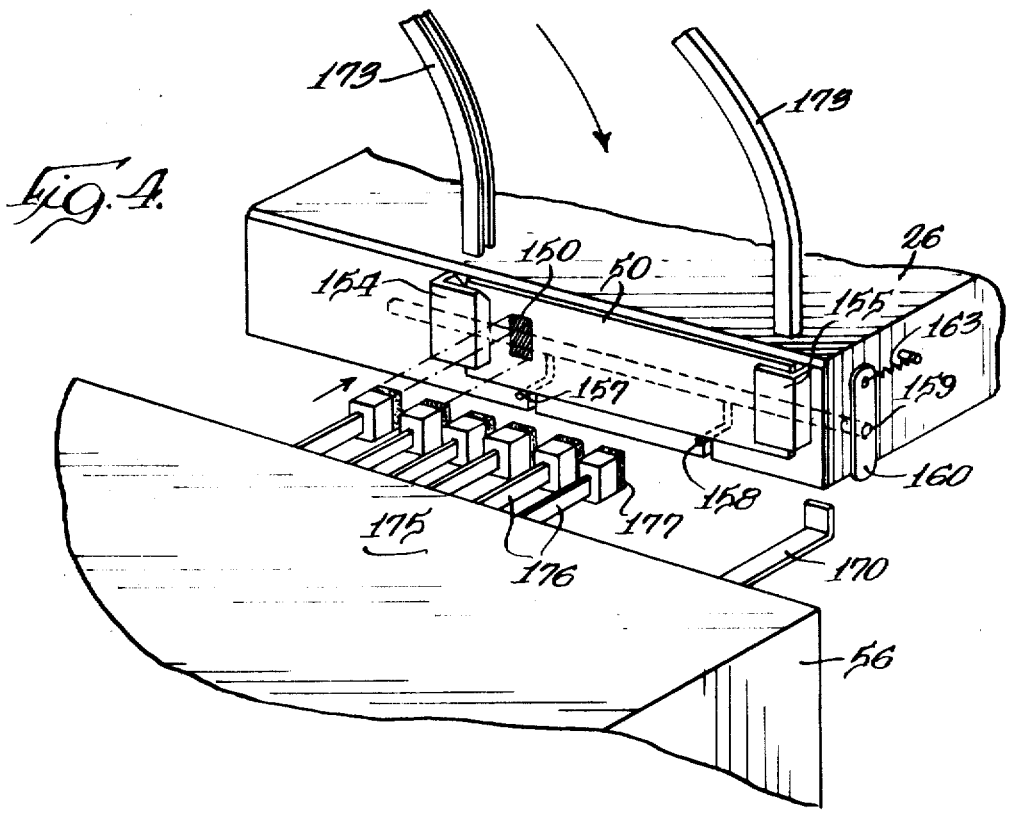
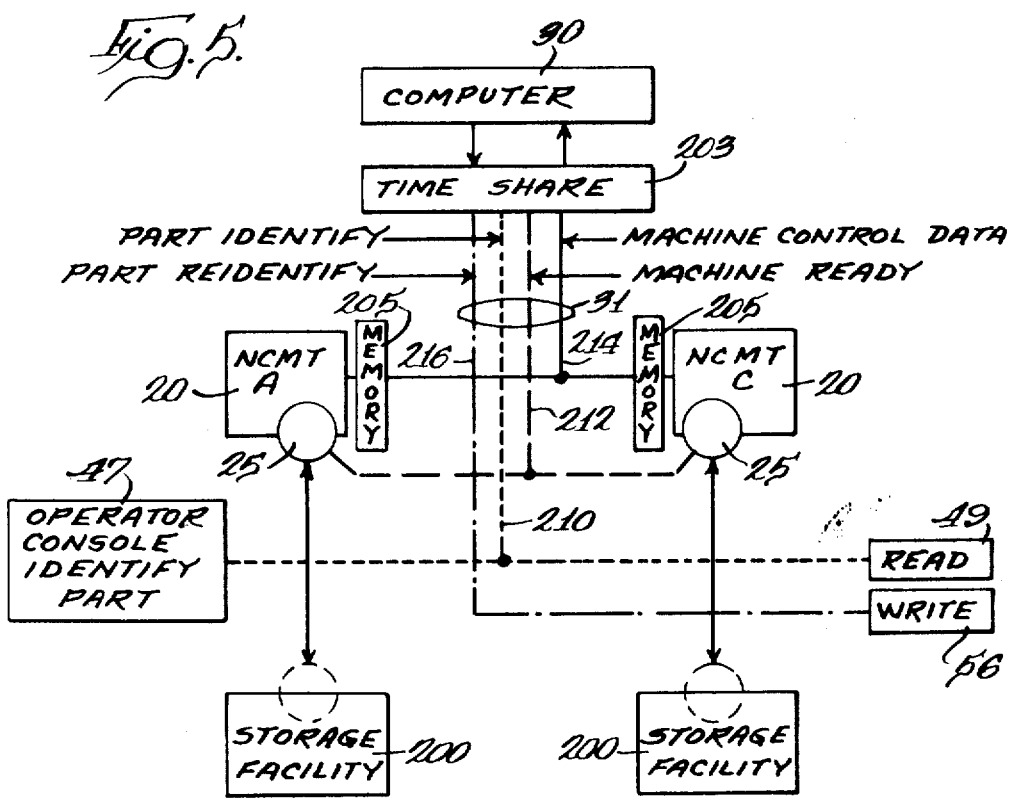

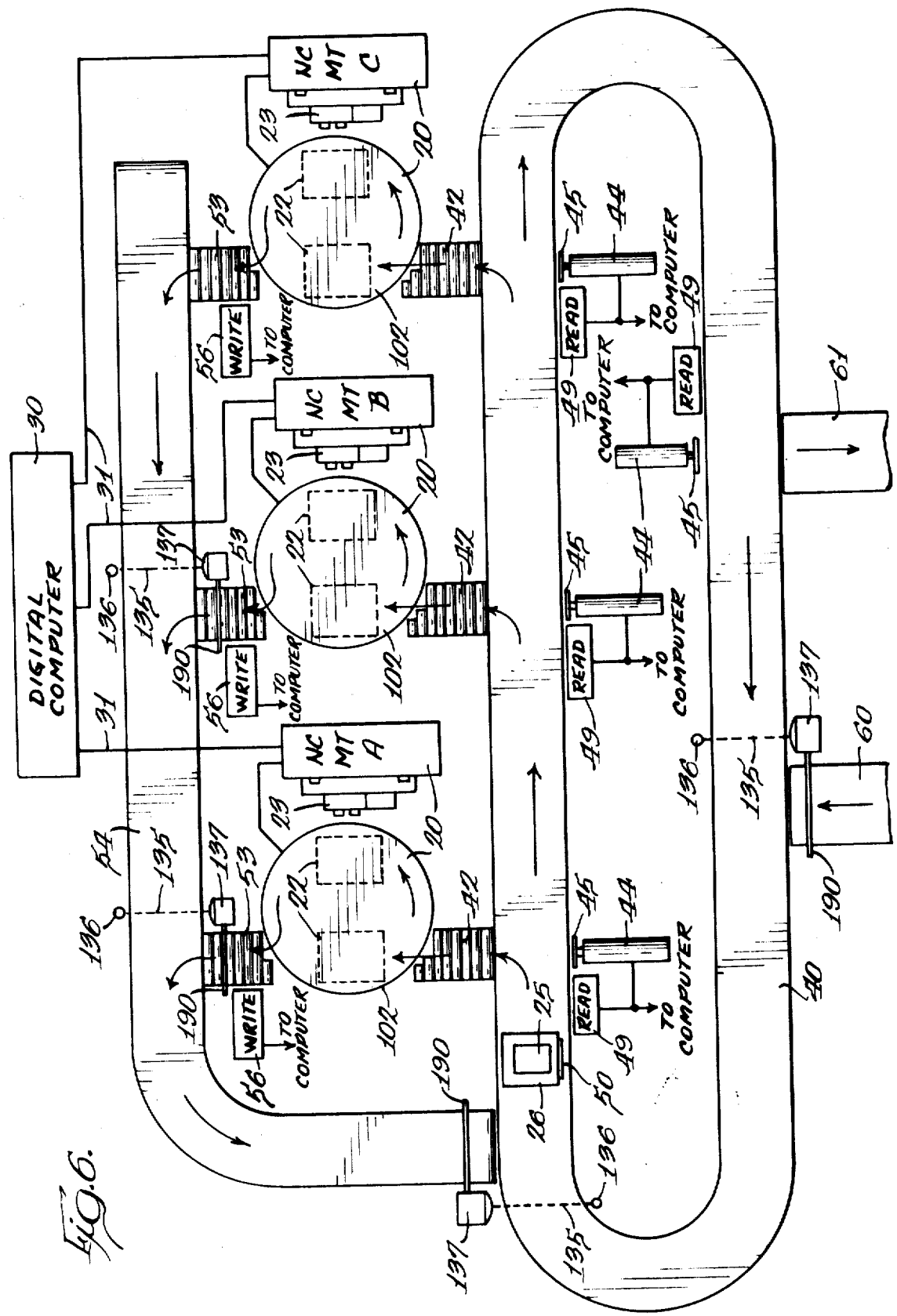

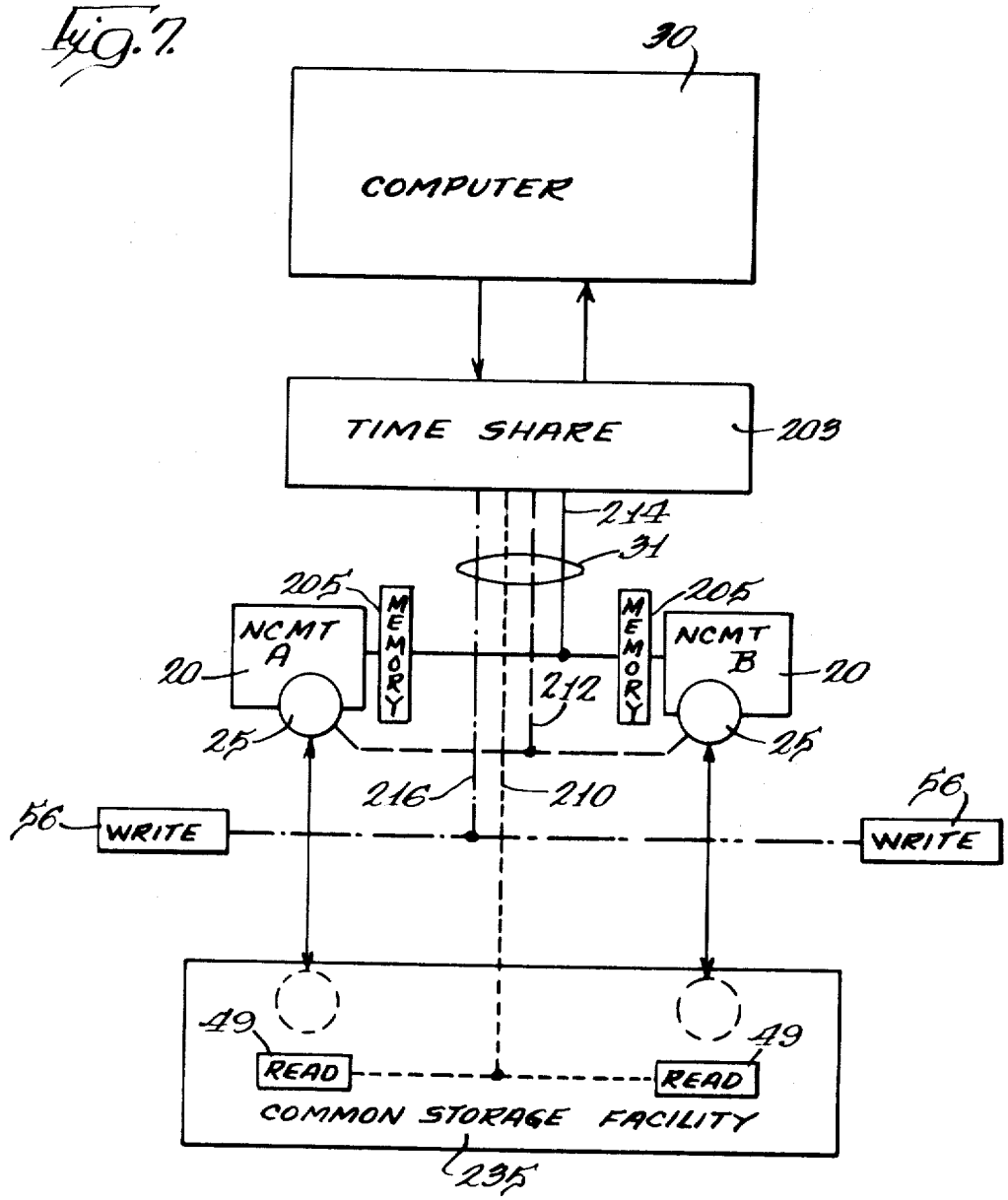

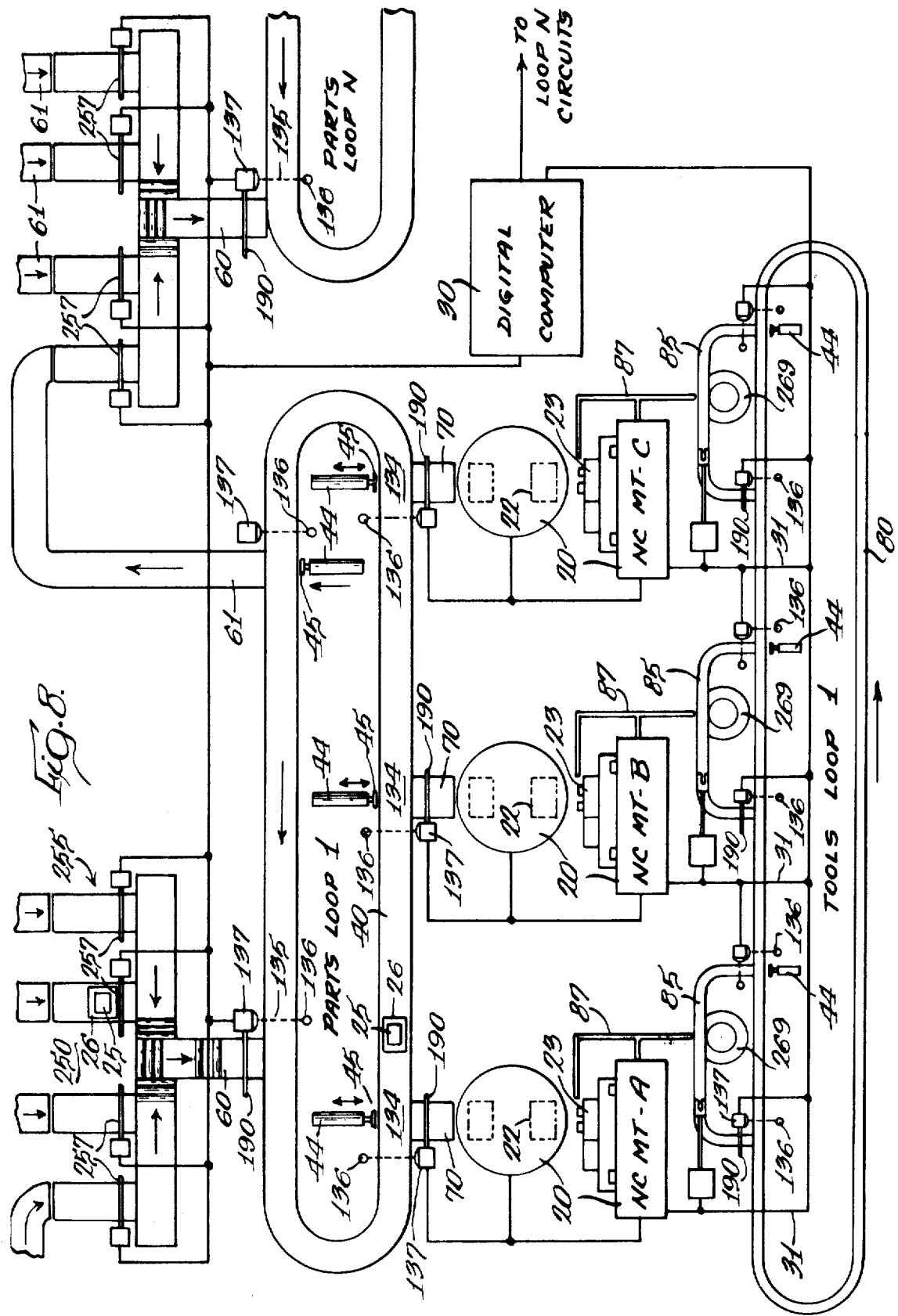

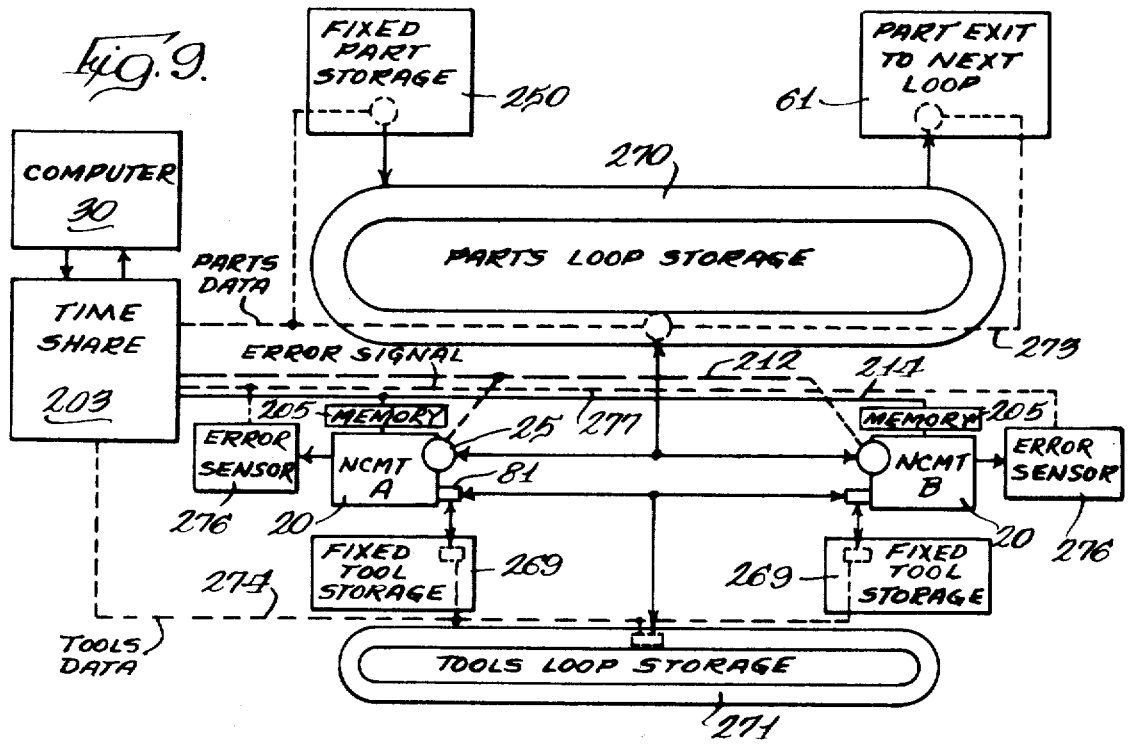
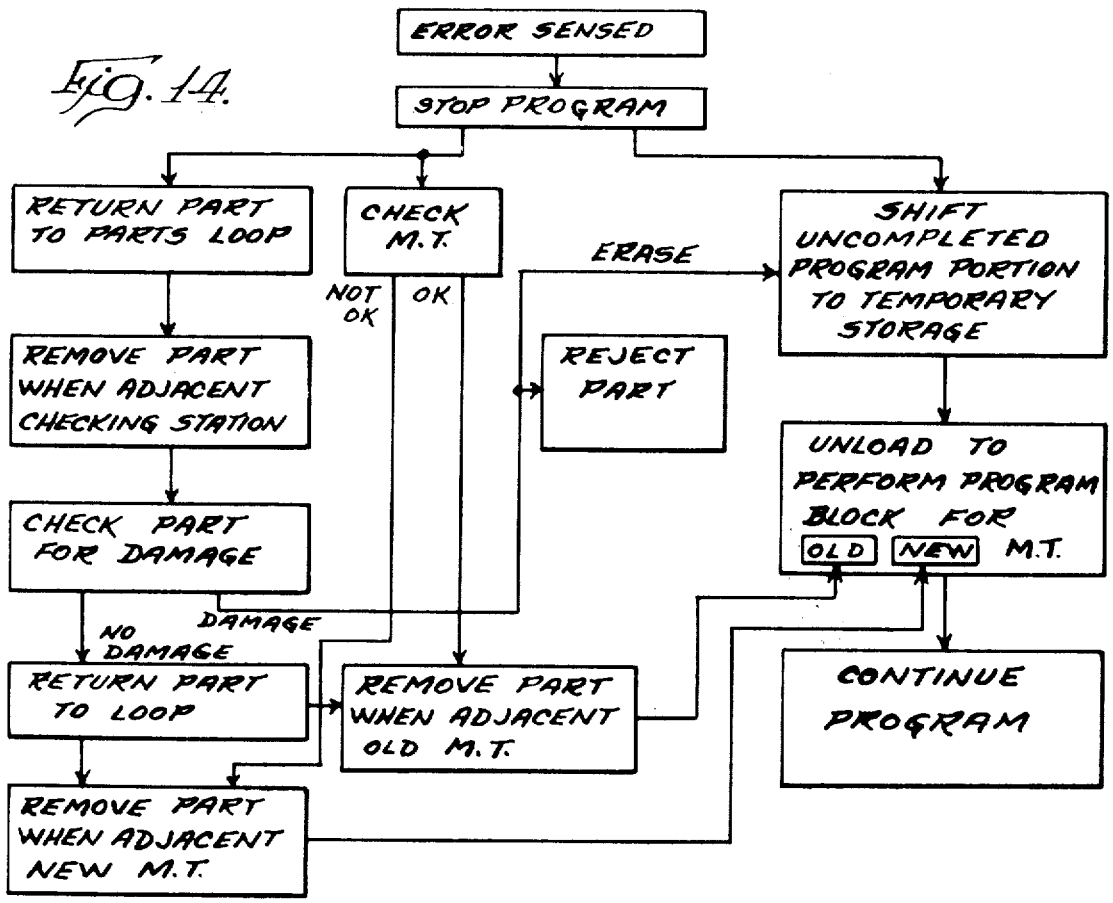

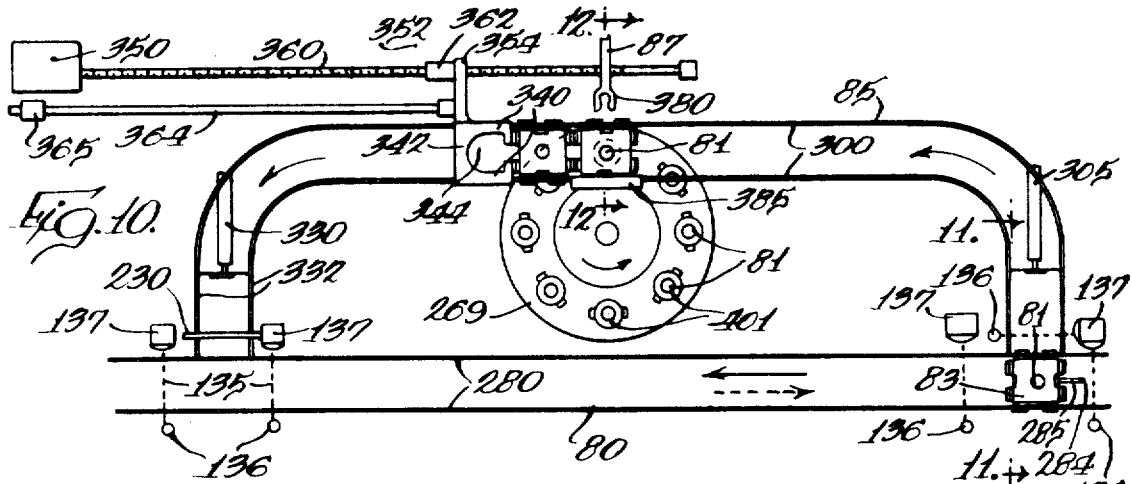
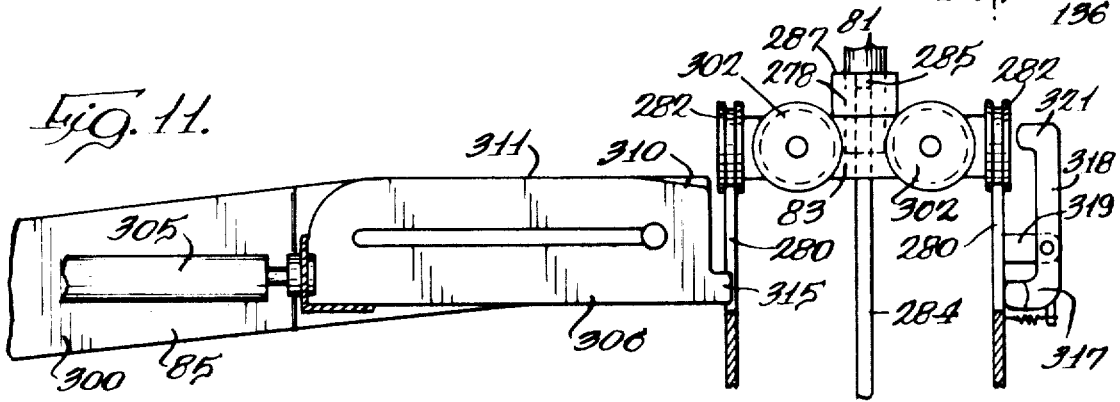
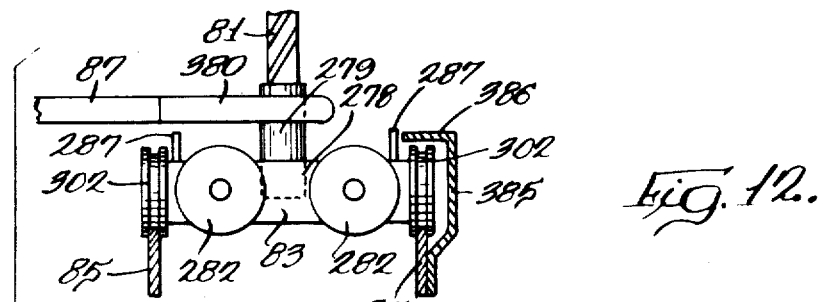
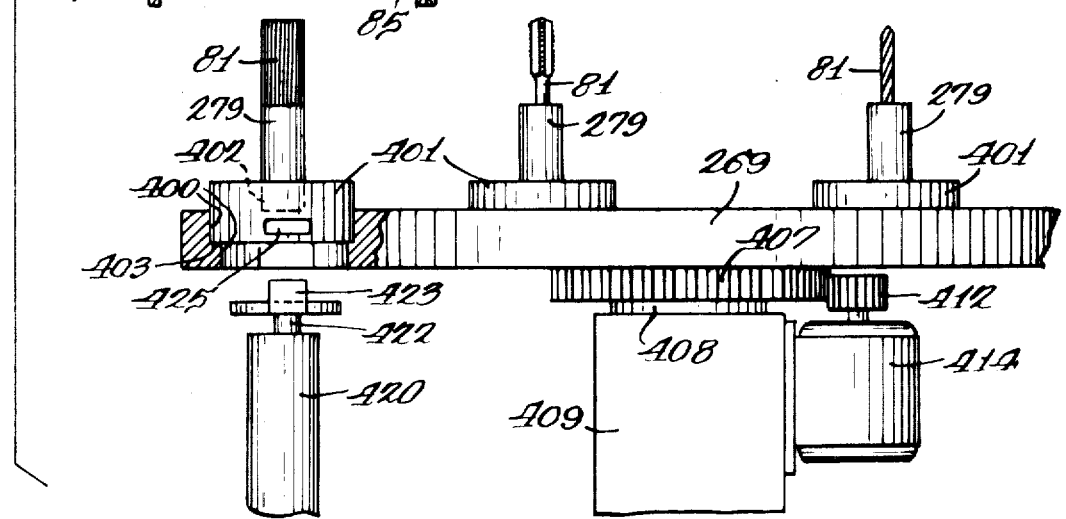

PLURAL MACHINE TOOL AND PART HANDLING CONTROL SYSTEM

This invention relates to a control system, and more particularly to a system which controls and coordinates the operation of plural machine tools and related apparatus and the part and tool handling mechanisms associated therewith.

In prior systems for performing multiple machining operations on a part, there have been attempts to provide coordination between plural machine tool stations and the transfer mechanism for transporting a workpiece or part between each station after completion of a machining operation. Such attempts have generally been concerned with increasing the otherwise limited number of variations which can be made in the final mass produced product.

When only a few parts are to be made, the limitations inherent in prior automatic machine tool systems become apparent. Individual machine tools in conventional transfer lines each perform a limited number of recurring machining operations, and cannot be readily converted to perform a number of highly complex machining operations. Furthermore, the transfer line itself conveys parts through a set pattern which allows only a limited number of variations. Each new product, however, may require that a raw part travel between the machine tools in a completely different order, necessitating the rebuilding of the transfer line. If the often-sought-after goal of an 37 automatic factory" is to be successful for piece part production, a system considerably more versatile than a conventional machine tool transfer line must be provided.

The present invention overcomes the disadvantages of prior automatic machining systems, particularly when used for less than large scale mass production. More particularly, some machine tools in the system are desirably of the general purpose type, capable of performing most or all of the machining operations which are to be performed at any given stage in production. A central computer stores computer programs for controlling the machining operations performed on a part, regardless of the particular machine tool at which the part is located. Unlike prior transfer lines, the system is capable of transporting a part to any of the machine tool stations for any particular machining operation which is to be performed, under control of stored routines and automatic handling equipment. Should any one machine tool station become inoperative, the partially completed part may be transferred to any available machine tool station for completion of the machining operations.

Different embodiments of the invention provide different degrees of automation, and the embodiment chosen for any given installation will depend upon the requirements of the user. All embodiments use a single "on-line" computer, that is, all machine tools in the system have continuous access to the computer, and can request or be given commands in "real time" when control data is required.

According to the first embodiment of the invention, the parts may be randomly supplied to any one of a number of machine tool stations, at which the identity of the part is determined and transmitted to the computer. In response thereto, the computer sends the proper program for machining the part to the machine tool at which the part is located.

In accordance with another embodiment of the invention, the computer selects a part which is to be machined at a particular machine tool station, directs the selected part from a central storage area to the preselected machine tool station, and thereafter controls the machine tool in accordance with a program corresponding to the machining operations which are to be performed on the part. The part is identified by a process number or code which serves to identify the computer program which directs the desired series of operations on all similar parts. At the completion of the program, the part, now modified by the machining operations just completed, is reidentified by a new process number.

The process number may be carried on the part itself or on pallets for conveying the parts to the machine tools. Alternatively, the process number and instantaneous location of each part may be continuously stored in the on-line computer memory, entirely eliminating the necessity for identifying numbers carried along with the parts.

As disclosed in the final embodiment of the invention, separate storage areas are provided both for parts and for the tools used by more than one machine tool station. Each tool is identified by a tool number or code. Both the tool numbers and tool locations, as well as the process numbers and part locations are continuously recorded in the on-line computer memory. The computer controls the conveying of selected parts and tools to a selected machine tool station, at which the machine tool is controlled by a program corresponding to the process number of the selected part. At the completion of the program, the part is reidentified in the computer memory with a new process number, and the part and tools are routed to storage or other stations as required.

One object of this invention is the provision of an improved control system for plural machine tools and related supporting apparatus and the part handling mechanism associated therewith.

One feature of this invention is the provision of a plural machine tools system in which a part may be machined at any one of a number of machine tool stations, each machine tool being under control of a program from a central source of programs available to all machine tools.

Another feature of this invention is the provision of a system in which the individual and the over-all operations of a plurality of simultaneously operating general purpose machine tools and associated part handling mechanisms are controlled by a single on-line computer.

Yet another feature of this invention is the provision of a control system which automatically identifies a part, and in response thereto causes a series of machining operations to be performed under control of a computer stored program.

A further feature of this invention is the provision of a control system which selects a particular part from a storage area for many different parts, conveys the selected part to a selected one of several machine tool stations, controls the operation of the selected machine tool station from a program of prepared machining operations chosen from a central library of different programs, and thereafter reidentifies the part in accordance with the machining operations just completed before returning the part to a storage area or sending it to a different machining center.

Still a further feature of this invention is the provision of a computer controlled machine tool system which economically produces a wide variety of different machined items each having a limited production run.

Yet a further feature of this invention is the provision of a machine tool and a related apparatus system operating under control of a computer program, which system can sense the occurrence of a condition which desirably requires correction before completing further machining operations, and is responsive to the sensed condition to modify the programmed operation of the system.

Further features and advantages of the invention will be apparent from the following specification and from the drawings, in which:

FIG. 4 illustrates a typical write or readdressing unit and associated coded part pallet, located at machine tool station NCMT-C of FIG. 1;

FIG. 5 is a schematic diagram of the plural machine tools and part handling system of FIG. 1;

FIG. 6 illustrates a plural machine tools and part handling system with a common storage facility for parts, a conveying mechanism for transporting a selected part to a selected one of the machine tools, and an on-line computer which controls the operation of all machine tools and reidentifies a part after completion of a machining operation;

FIG. 7 is a schematic diagram of the plural machine tools and part handling system of FIG. 6;

FIG. 8 illustrates a plural machine tools and part and tool handling system with common storage facilities for parts and tools and an on-line computer for controlling and coordinating the operation of the parts and tools conveying mechanisms and the operation of the machine tools;

FIG. 9 is a schematic diagram of the plural machine tools and part and tool handling system of FIG. 8;

FIG. 10 illustrates a portion of the temporary and the fixed tool storage facility for one of the machine tool stations of FIG. 8;

FIG. 11 is a fragmentary view along lines 11-11 of FIG. 10, showing an entry station for removing tools from the common tool storage facility shared by all machine tools;

FIG. 12 is a fragmentary view along lines 12-12 of FIG. 10, showing an automatic tool changer station for removing a tool from temporary tool storage, and the lift mechanism for raising tools from fixed tool storage to the position of the automatic tool changer station;

FIG. 14 is a flow diagram of a subroutine performed by the master program of FIG. 13.

Figure 1:
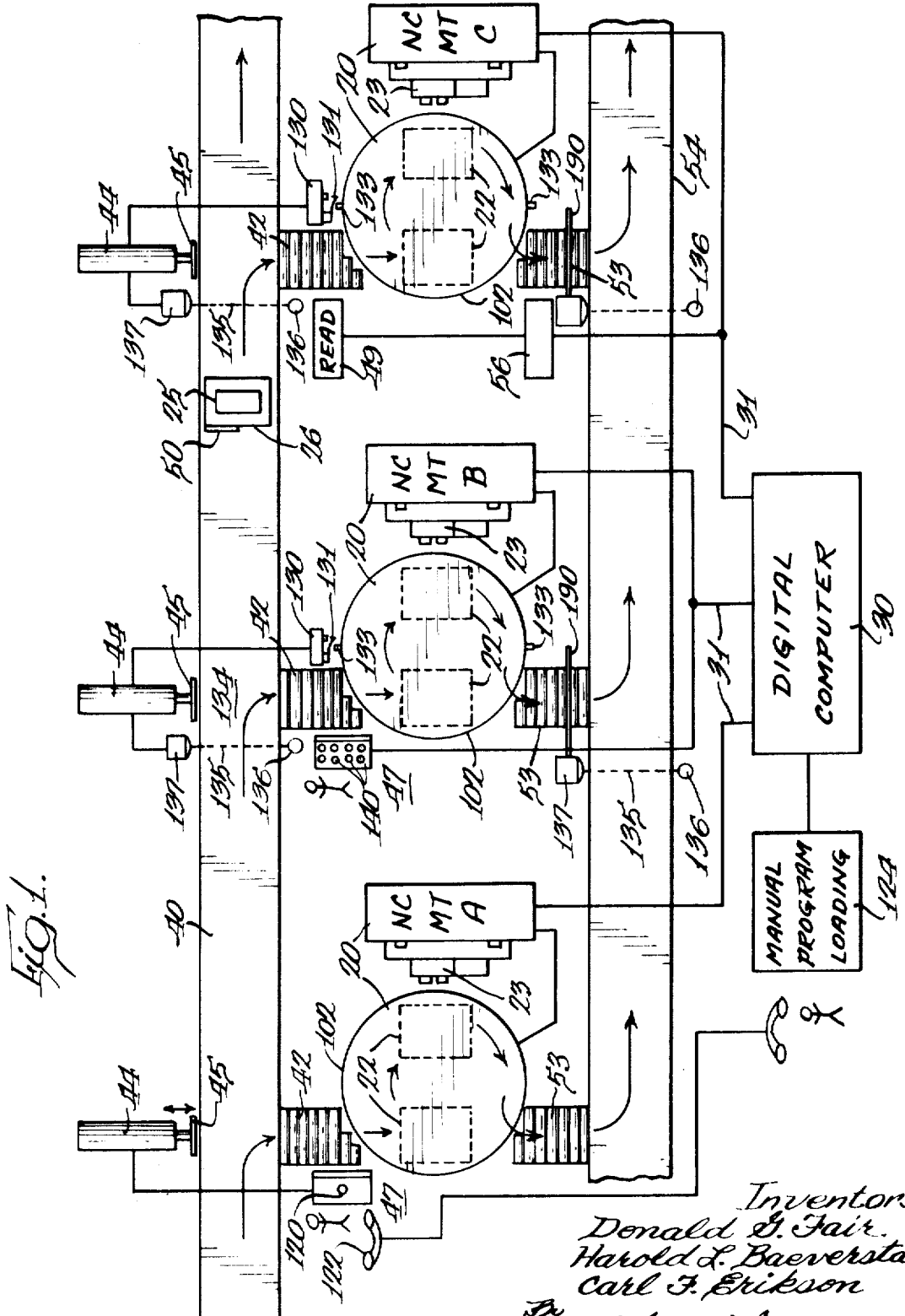
FIG. 1 illustrates a plural machine tools and part handling system for transporting random parts to individual machine tools, and for transmitting the identity of the part to an on-line computer which controls the operation of all machine tools.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated. The scope of the invention will be pointed out in the appended claims.

GENERAL OPERATION

In the drawings, three embodiments of the invention are illustrated in FIGS. 1—5, 6—7 and 8—14 respectively. As best seen in FIGS. 1, 6 and 8, each embodiment uses a plurality of numerically controlled machine tools 20, of which three have been illustrated, labeled NCMT-A through NCMT-C, in conjunction with the part handling apparatus associated therewith. The machine tools 20 are preferably general purpose, multiaxis machine tools adapted for numerically controlled operation, and each capable of performing a number of diverse machining operations, such as drilling, milling and boring. Each machine tool 20 includes a worktable 22 to which a part or workpiece is secured. The worktable, and hence also the part, may be translated and/or rotated along several axes with reference to a spindle head 23 which holds a tool (not illustrated) for performing a machining operation on the part.

Each part 25 is secured to a pallet 26 which serves as a carrier for transporting the part to the machine tools, and further serves as a reference base during the machining operations. Each pallet includes part locators which orient and retain the part with respect to certain fixed reference points, in a manner similar to modular fixtures and to pallets used in transfer lines. It is not necessary, however, that the part be secured to a pallet, and the part alone could be conveyed to the machine tools and clamped into position by a suitable index mechanism as used in some conventional transfer lines.

The parts 25 are individually identified by a process indicia, typically in the form of a coded number, which is representative of the present status of the part as indicated by the history of machining operations already performed thereon. The process number changes after a series of machining operations is completed, in order to reidentify the part as to its present status. For example, a particular process number may indicate that a certain number of holes of specified diameter, spacing and depth have been drilled in a blank engine block. The process number may be carried along with each part, or a different means may be provided to identify the process number of unlabeled parts, as will be explained later.

All machine tools 20 are simultaneously controlled by a single on-line general purpose digital or analog-digital hybrid computer 30. The memory of the computer stores a plurality of programs which are each capable of controlling any one of the numerically controlled machine tools in order to produce a particular part. Separate, shared, or multiplexed data channels or links 31 couple the output of the computer to each of the machine tools. A master control couples an individual machine tool program to the data link or channel 31 directly associated with the machine tool which is to perform the machine operation on a particular part, as identified by its process number. It should be understood that the eventual direct data links may be coupled to the output of the computer by way of additional data links which are shared in common with other machine tool stations.

The output from the digital computer 30 is similar to the output from conventional tape readers for numerically controlled machine tools, and consists of a series of blocks of binary coded control information, at least some of the blocks being representative of the direction and amount of movement of the controlled machine tool elements from their previous position. Each machine tool 20 has associated therewith a numerical control of conventional design for converting the binary coded information into analog signals which drive the motors (not illustrated) associated with worktable 22 and spindle head 23.

Parts 25 may be either randomly or selectively supplied to the machine tool stations, in accordance with different embodiments of the invention. In the first embodiment, illustrated in FIGS. 1—5, parts are randomly supplied to the machine tools, and are identified when they reach the machine tool station in order to select the proper program that is to be coupled from computer 30 to the data link 31 connected with that machine tool station.

More particularly, a belt conveyor 40, which moves continuously past input stations 42 for each of the machine tools 20, serves as the incoming storage area for parts which are to be machined. A pneumatic or hydraulic cylinder 44 has a plunger 45 which when actuated is propelled transversely across conveyor 40 in order to push a part pallet onto an adjacent input station 42 for the machine tool associated therewith. Station 42 has freely rotatable rollers for gravity feeding the pallet to a pallet loader for the machine tool 20.

Parts on conveyor 40 are supplied to a machine tool station either in response to an operator manually selecting the part he wishes to machine, or in response to a machine tool being available to machine a new part. Once the part reaches a given machine tool station, its process number is identified and transmitted to computer 30. Computer 30, in response to the process number from a given machine tool, connects a program corresponding to the machining operations which are to be performed on that part to the data link 31 for that machine tool.

The identification of the process number may be made visually by an operator who observes the part and causes the process number corresponding thereto to be transmitted from an operator console 47 to the computer. Alternatively, the identification may be made automatically by a read unit 49 which scans a process number record medium, such as an identification card 50 carried by the pallet 26 for the part, and transmits the process number carried by the card to the computer.

When the machining operations on a program are completed, the part is ejected onto an output station 53 which empties onto another belt conveyor 54 which serves as the outgoing storage area for completed parts. At those machine tool stations using read units 49 for automatic part identification, a write unit 56 associated with the output station 53, substitutes a new identification card 50 for the old card in order to reidentify the part in view of the machining operation just completed. The parts on conveyor 54 may consist of finished products, or intermediate parts in the manufacturing process which are conveyed back to incoming conveyor 40 for further machining operations by the machine tools.

In the second embodiment illustrated in FIGS. 6 and 7, computer 30 selects from the incoming storage area the parts which are to be machined, conveys the same to a predetermined machine tool station, and then couples the program corresponding to the selected part to the data link 31 for the predetermined machine tool station. More particularly, the incoming storage belt conveyor 40 is arranged into a continuous loop for circulating parts 25 until they are needed. Each part 25 is identified by the process number identification cards 50 carried on pallets 26. When computer 30 determines that a given program is to be run at a given machine tool station, as for example NCMT-B, read unit 49 opposite input station 42 for NCMT-B is activated to scan the cards 50 which move thereby on the loop conveyor. When a process number is read which identifies the part necessary for the program to be run, pneumatic cylinder 44 is energized to unload the part onto the input station 42 for NCMT-B. At the same time, computer 30 couples the preselected program to the data link 31 for machine tool station NCMT-B.

At the completion of the program, the part is ejected onto the output station 53, at which write unit 56 substitutes a new card for the previous card in order to reidentify the part by a new process number. The part is thereafter released onto output conveyor 54, which returns the machined part to the input storage area loop conveyor 40. Separate input and output conveyors 60 and 61, respectively, add new parts or remove stored parts from loop conveyor 40.

In the final embodiment of the invention illustrated in FIGS. 8—14, both parts and tools may be selectively conveyed to a predetermined machine tool station. The identities of all of the parts and tools, as well as their instantaneous location in the system, are retained in the memory of computer 30, completely eliminating the necessity for part and tool identification cards or the like, and read and write address units. All of the machine tools in the system are divided into groups serviced by separate part and tool storage areas located adjacent thereto.

As seen best in FIG. 8, machine tools NCMT-A through C are adjacent a continuous incoming storage area conveyor 40 formed into a loop, and identified as PARTS LOOP 1. A combined incoming and outgoing parts station 70, as a reversible direction conveyor belt, serves to both remove pallets 26 from conveyor 40 for loading onto machine tool 20, and to remove pallets from the machine tool and reload them onto the temporary storage loop conveyor. Parts are removed from temporary storage loop 40 by outgoing conveyor 61, which serves as one of the inputs for raw parts to be machined by a further group of machine tools (not illustrated) associated with PARTS LOOP N, where N represents any integer. In this manner, an automated assembly line is formed which is suitable for either low or high volume production.

In a manner similar to parts storage, the tools used in common by two or more of the machine tools are stored on a continuous belt conveyor 80, identified as TOOLS LOOP 1. Each tool 81 (see FIGS. 10—12), identified by a tool number, is individually held in a shuttle car 83 on conveyor 80. All tools 81 which are to be used by a particular machine tool during the running of a program are shunted from loop 80 onto a temporary storage side track 85 for the machine tool station. An automatic tool changer 87 at each machine tool removes tools from side track 85 and places them in the associated spindle head 23.

Computer 30 continuously stores the process numbers and the tool numbers which identify all of the parts and tools, respectively, in the system. For example, when a particular part is transported from PARTS LOOP 1 onto outgoing conveyor 61, the computer transfers the process number associated therewith into a memory section storing the identity of parts located at the input area for PARTS LOOP N. Computer 30 also selects the particular machine tool 20 at which a program is to be run, and causes the part and tools necessary for the program to be conveyed from the parts and tools storage areas to the selected machine tool. At the completion of the program, the part is reidentified in the computer memory with a new process number corresponding to the machining operation just completed, and thereafter the part and tools are returned to their respective storage areas.

While three machine tool stations have been illustrated in the drawings, it should be understood that, in a complete factory, additional machine tool stations and related apparatus may be controlled and coordinated by the computer, in the same manner as described herein for the illustrated machine tool stations. Related apparatus may include an inspection station at which dimensions and tolerances are sensed and compared with calculated values in order to check on the accuracy of the prior machining operations. Other examples of related apparatus will be apparent to those skilled in the art.

A detailed description of the structure common to each embodiment of the invention, as well as the structure and operation of each of the three embodiments, will now be presented.

REPRESENTATIVE MACHINE TOOL STATION

Figure 2:
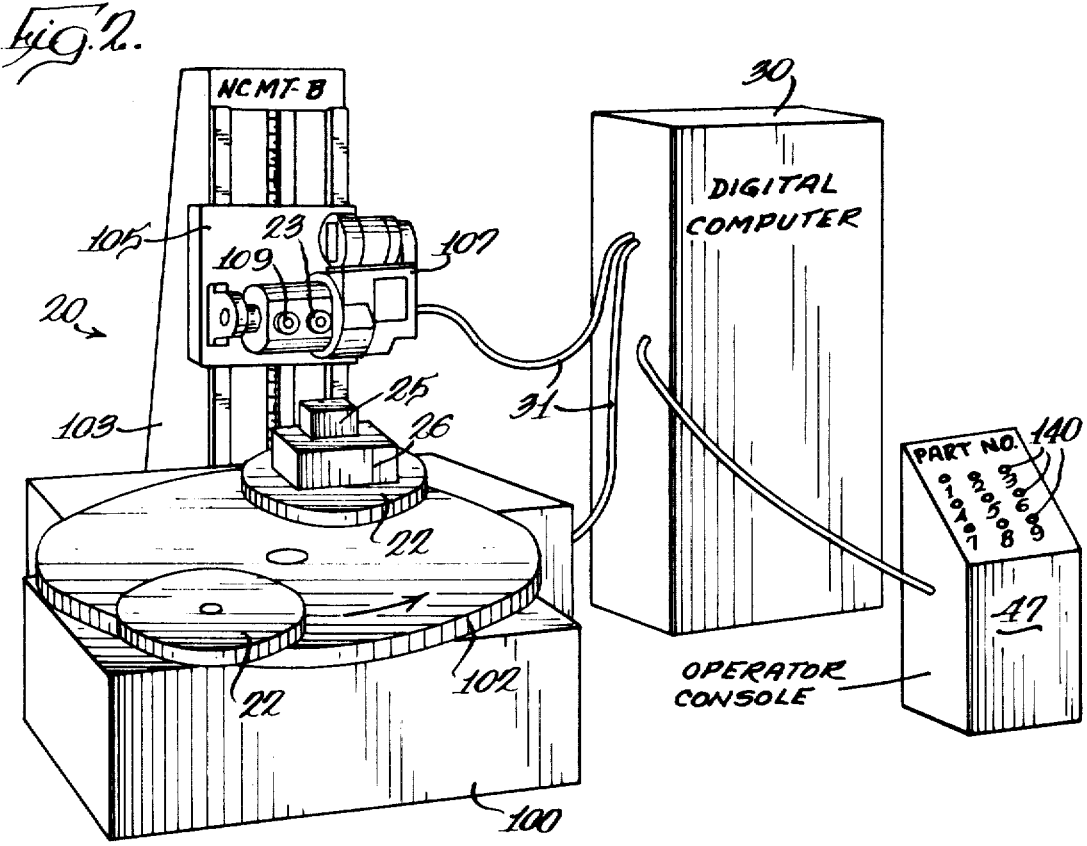
FIG. 2 illustrates in more detail a typical machine tool station, as presented by station NCMT-B of FIG. 1.
Figure 3:
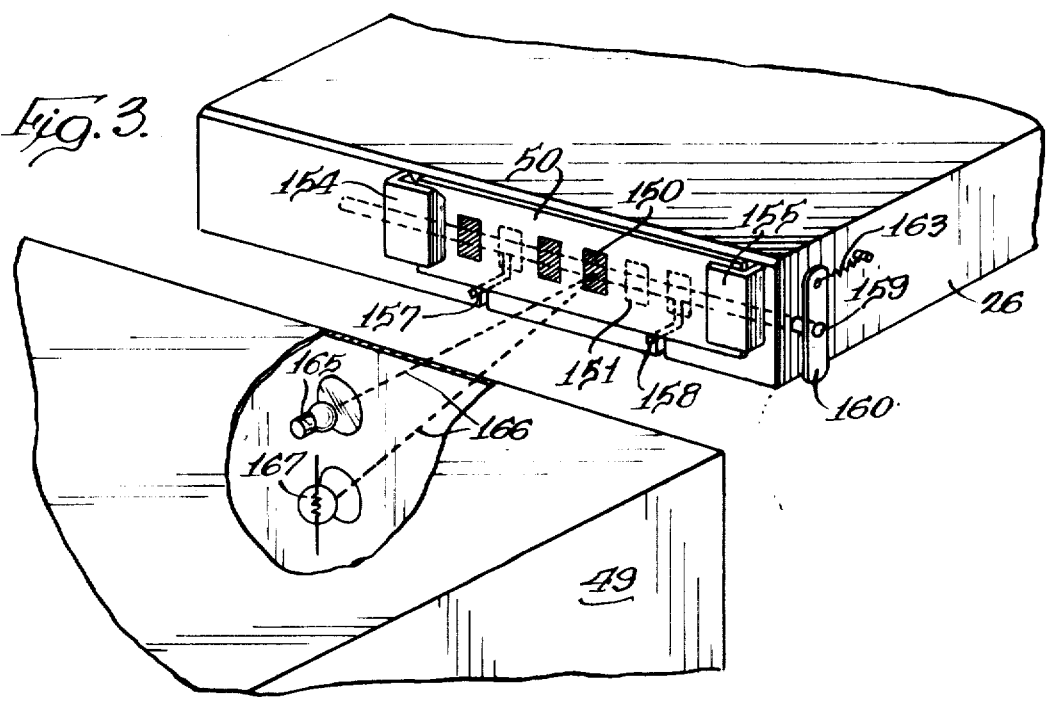
FIG. 3 illustrates a typical read sensor and coded part pallet read thereby, located at machine tool station NCMT-C of FIG. 1.

In FIG. 2, a representative, general purpose, numerically controlled machine tool 20 of a type suitable for use with the invention is illustrated, in conjunction with station NCMT-B of FIG. 1. A bed or base 100 supports a pair of rotary worktables 22 mounted on a rotary pallet changer 102. While dual worktables decrease the amount of time necessary to load and unload a part, it should be understood that only one worktable is necessary.

When using dual worktables, a new part and pallet is loaded on an inactive worktable while another part is being machined on the other worktable. At the completion of the machining operations, pallet changer 102 rotates 180° in order to position the newly loaded part for a machining operation, while the previously machined part may be removed from its worktable. Conventional automatic mechanism (not illustrated), such as used in transfer lines, may be used to load and unload the part pallets onto and off of the worktables.

A column, which extends upward from base 100, supports a vertical saddle 103 upon which a tool mechanism is mounted. A transmission head 107, mounted on vertical saddle 105, drives spindle head 23 and, if desired, an auxiliary head 109 adjacent thereto.

Conventional ways and linear tables (not illustrated) define three translational axes along which worktable 22 and spindle head 23 can move. An additional two axes of movement are provided by the rotational movement of both worktable 22 and spindle head 23. The representatively illustrated five axes machine tool is a Sundstrand OMNIMIL, Model OM-3, equipped with an automatic pallet changer. However, any general purpose machine tool suitable for numerically controlled operation may be used in place thereof. It is merely necessary to couple the input of the conventional numerical control unit for the machine tool to channel 31 of computer 30, rather than to the output of a tape reader. Similarly, it should be understood that while two or more machine tools preferably can perform the same machining operations, it is in no way necessary that the machine tools be in other ways identical to each other.

RANDOM SUPPLY OF PARTS (FIGS. 1—5)

In FIGS. 1—5, the first embodiment of the invention is illustrated, in which parts are randomly supplied to each of the machine tools 20 in the system. The random supply of parts to a machine tool, and the subsequent identification of the part, may be accomplished by different methods, as represented by the structure associated with each of the machine tools NCMT-A through C.

At NCMT-A, operator console 47 includes a selector switch 120 which actuates pneumatic cylinder 44 in order to remove a pallet from conveyor belt 40 when an operator visually observes a part on conveyor 40 which requires special attention. Such attention may be required, for example, because the part is a seldom manufactured item and the program therefore is not normally stored in the memory of computer 30. By means of a telephone 122 at console 47, the operator converses with a computer programmer remotely located at a library which stores seldom used programs. The desired program is loaded by the programmer into a manual program loading unit 124 in order that computer 30 may have available the necessary program. In addition, NCMT-A is useful when a new program is being developed for machining a part, or for making corrections in an existing program.

At the remaining machine tools NCMT-B and C, pneumatic cylinder 44 is actuated whenever a part passes adjacent thereto and one of the worktables 22 is empty. A switch 130 has an arm 131 located in the path of a pair of projections 133 extending from opposite sides of the rotary pallet changer 102. When a machining operation has been completed, the rotation of pallet changer 102 causes the projection 133 to strike arm 131, actuating switch 130 to indicate that a worktable is about to be empty. Thereafter, the next part 25 which passes cylinder 44 will be ejected onto input station 42.

The passage of a part is detected by a photoelectric circuit 134 in which a photobeam 135 extends from a light source 136 to a photoelectric cell 137 located on the opposite side of conveyor 40. As the part breaks the photobeam 135, photoelectric cell 137 is darkened, producing an output signal. The breaking of photobeam 135 has no effect on cylinder 44 unless switch 130 has been actuated just prior thereto. Upon actuation of cylinder 44, the circuit associated with switch 130 is reset, in order that the next part breaking photobeam 135 will not be ejected onto input station 42. In this manner, parts are automatically transported to either NCMT-B and/or C whenever a worktable is available. After being removed from conveyor 40, the identity of the part is determined.

At NCMT-B, an operator visually observes the part at input station 42, and manually depresses pushbuttons 140 at console 47, seen in more detail in FIG. 2, in order to identify the process number of the part.

Preferably, however, the identification of the process number is made automatically, as illustrated at station NCMT-C. Upon being ejected from conveyor 40, a read unit 49, FIG. 3, reads the identification card 50 carried with part 25 and transmits signals identifying the process number to computer 30. The process number identification card 50, mounted on the side of the part pallet 26, carries a binary code formed from the presence or absence of indicium such as darkened areas 150 extending horizontally across the card. The presence of a darkened area 150 represents a binary bit 1, while the absence of a darkened area, as indicated by dashed lines 151, represents a 0 binary bit. The most significant bit is carried on the right-hand side of the card. For the particular card illustrated in the drawings, indicium 150 and 151 identify the binary number 001101, which represents in decimal form the process number 13.

Card 50 is removably held against pallet 26 by a pair of fixed L-shaped brackets 154 and 155 which form slots for the vertical ends of card 50. The bottom portion of card 50 rests against a pair of horizontal fingers 157 and 158 connected through a rod 159 to a lever 160. The lever may be rotated to move fingers 157, 158 away from the bottom edge of the card, allowing the card to drop through the slots. The fingers are normally maintained in a horizontal plane, to retain card 50 in the position illustrated in FIG. 3, by a spring 163 which biases lever 160 in a vertical plane.

The process number coded on card 50 is read by read unit 49 when the pallet passes thereby. A light source 165 projects a photobeam 166 against the binary code on card 50. A photocell 167 is positioned in the path of the beam reflected off the card. When photobeam 166 strikes a blackened area 150 on the card, the reflected light is reduced and photocell 167 is darkened, producing a change in the electrical output signal which indicates the presence of a 1 binary bit.

By means of conventional gating apparatus (not illustrated), the operation of read unit 49 is synchronized with the passage of card 50, by making photocell 167 operative only during the time at which a coded area of card 50 passes photobeam 166. While a read unit for generating binary coded signals in serial form has been illustrated in FIG. 3, it will be appreciated that such is merely representative of the many readers having an output in either serial or parallel form which could be used in place thereof.

After the read operation, the part is loaded on the machine tool at station NCMT-C of FIG. 1. Upon the completion of the machining operations, computer 30 rotates worktable 22 to a position which allows pallet 26 to be unloaded onto output station 53 with an orientation so that the side of the pallet which carries card 50 passes adjacent write unit 56. The write unit 56 replaces the old card with a new card which identifies a new process number for the part, as illustrated in detail in FIG. 4.

As pallet 26 reaches the proper position with reference to write unit 56, conventional apparatus (not illustrated) temporarily delays or stops the pallet for a short time period sufficient to complete a write cycle. As pallet 26 is brought to a stop, an arm 170, FIG. 4, extends against lever 160, rotating fingers 157 and 158 away from the bottom of card 50 to allow the card to drop through the slots formed by brackets 154 and 155. Arm 170 then retracts, and a new blank card 50 is guided along a pair of tracks 173 onto the position formerly occupied by the previous coded card.

When the blank card 50 is in position, resting against fingers 157 and 158, a printing mechanism 175 is actuated to cause a new binary code to be printed on card 50. Mechanism 175 consists of individual print arms 176 with inked print heads 177, spaced in a horizontal row corresponding to the order of the binary bits which are to be coded on card 50. When a 1 binary bit is present at the binary position represented by a particular print arm 176, a solenoid mechanism (not illustrated) within unit 56 is energized to extend arm 176 and cause head 177 to strike card 50, printing a darkened area 150 representative of a binary 1 bit. While the illustrated write mechanism prints the binary code after a blank card has been dropped into position on pallet 26, it will of course be recognized that the binary code could be printed on card 50 before being dropped into position on pallet 26. Similarly, other equivalent means for encoding a part or a pallet with a number could be used in place of the illustrated binary coded card system, with corresponding changes being made in the read and write units.

In order to prevent collisions at intersections where a part joins other parts on a conveying mechanism, movable gates 190 are provided to prevent the passage of a part should a photoelectric circuit associated therewith indicate that a part on another conveyor having priority is approaching the intersection. The photoelectric circuit projects a photobeam 135 across the conveyor having priority to a photocell 137 connected in circuit to lower gate 190 when the photobeam is broken. Similar gates 190 and associated photoelectric circuits are located at each intersection where two or more part conveying systems join. While mechanical gates 190 have been illustrated, an equivalent electrical gating system may be employed in place thereof. For example, when a photobeam is broken across a conveyor having priority, computer 30 may cause the other or lower priority conveyor to stop or slow its movement until the part on the higher priority conveyor has passed the intersection. At such time, the normal speed of the lower priority conveyor may be restored.

A schematic diagram of the control system of FIG. 1 is illustrated in FIG. 5. For simplification, only two of the machine tools are illustrated, namely NCMT-A and NCMT-C. Parts 25 are illustrated as being stored in separate storage facilities 200, consisting of belt conveyors 40 and 54 of FIG. 1, because there is no coordination between the supply of parts to the machine tool. The other operations, however, are coordinated by computer 30.

Since the computer 30 is capable of internally generating data for only a single machine tool at any given moment of time, a control or time share unit 203 is provided to cycle computer 30 between the data links 31 for each of the machine tools in the system. The computer generates data for any given machine tool at a much faster rate than it can be used, due to the inherent time lag necessary for a large electromechanical system to respond to a command. In order to store this data, and thus free the computer to generate data needed at the next machine tool in the system, each machine tool has a temporary storage memory 205 associated therewith, which may be similar to the intermediate storage registers conventionally used in numerically controlled machine tools to store data from a tape reader. Thus, while NCMT-A is in the process of using data the computer has just loaded into the temporary storage memory 205 associated therewith, time share unit 203 switches computer 30 to the data link 31 coupled to the next machine tool in the system.

The number of machine tools controllable by a single computer is limited only by the requirement that the computer be able to generate data for each machine tool in the system and return to the first machine tool prior to or simultaneous with that machine tool having assimilated the data stored in its temporary memory. Approximately 100 or so machine tools can be simultaneously serviced by a large, high-speed digital computer such as an IBM 360. Time share unit 203 may be a known type of time sharing device for coupling a plurality of Input/Output devices to a single selector channel of a general purpose digital computer, each machine tool in the system being considered an Input/Output device. Units of this nature are known in the art, for example, in U.S. Pat. No. 3,465,298 to La Duke et al. issued Sept. 2, 1969, and filed Oct. 26, 1969, The output channel of computer 30, switched by time share unit 203 to each of the data links 31 for the machine tools, consists of a plurality of data and control lines, shown in simplified schematic form in FIG. 5, As previously described, the data transmission path between the computer output channel and the individual data links 31 may include lines which are shared in common by all or some of the machine tool stations. As a new part 25 is conveyed from storage facility 200 to a particular machine tool, the process number of the part is transmitted over a PART IDENTIFY line 210 to computer 30. For NCMT-A, the process number identifying signal originates at operator console 47, as previously described. Should the part be conveyed to NCMT-C, however, the process number identifying signal originates at read unit 49. In response to the signal on line 210, computer 30 searches its memory for the program which machines the identified part.

When part 25 reaches the machine tool station, and is properly positioned on the worktable, a MACHINE READY line 212 signals the computer that the machining operations may begin. In response to this signal, the control information from the selected program is transmitted from the computer memory and through a MACHINE CONTROL DATA line 214 to the machine tool. At the completion of the program, a signal which identifies a new process number for the part is transmitted over a PART REIDENTIFY line 216 to write or readdressing unit 56, assuming the machine tool station uses automatic part identification and reidentification, as does NCMT-C. At stations using visual identification of part identity, as NCMT-A, PART REIDENTIFY line 216 is not necessary and may be eliminated since the part will be identified visually at its next location.

SELECTIVE SUPPLY OF PARTS (FIGS. 6 and 7)

In FIGS. 6 and 7, the second embodiment of the invention is illustrated, in which the computer determines the process number of a part necessary for a program which is to be run, searches a common parts storage area until a part with the corresponding process number is found, and conveys the part to a preselected machine tool at which the program is to be run. This embodiment operates in generally the same manner as does station NCMT-C of FIG. 1, previously described, and accordingly only the differences in operation will be described in detail.

Read units 49 are located adjacent parts storage conveyor 40 in a direction preceding the pneumatic cylinder 44 for each machine tool input station. When unit 49 scans a card 50 having a process number corresponding to the process number necessary to run a program, cylinder 44 is actuated to eject the part onto incoming station 42. The parts 25 not so ejected remain on conveyor 40, circulating around the loop until they are either ejected onto one of the incoming stations 42, or onto outgoing conveyor 61.

As a part is being loaded on worktable 22, computer 30 couples the program corresponding to the process number of the part to the data link 31 associated with that machine tool. Upon completion of the program, the part is transported to outgoing station 53, reidentified by write unit 56, and thereafter ejected into conveyor 54 and returned to the circulating loop conveyor 40.

In FIG. 7, a schematic diagram of the control system of FIG. 6 is illustrated. The system operates similar to that previously described for NCMT-C of FIG. 5, with the following differences. Read units 49 are located within a common storage facility 235, formed by continuous loop conveyor 40 of FIG. 6. After computer 30 determines the process number of the part which is to be machined and the machine tool at which the program is to be run, it opens PART IDENTIFY line 210 associated with the selected machine tool in order to compare the signal from read unit 49 with the process number signal from the computer memory. When the signals match, the part 25 adjacent the read unit is ejected from facility 235 and conveyed to the machine tool associated with that read unit. Thereafter, the operation is similar to that previously described for NCMT-C of FIG. 5.

COMPUTER RETAINED PART AND TOOL IDENTITY (FIGS. 8—14)

General Operation

In the final embodiment of the invention, FIGS. 8—14, the necessity for carrying identification indicia with a part is eliminated, since computer 30 retains in its memory the instantaneous location and identity of all parts and tools in the system. Conveyor belt 40, FIG. 8, is formed into a continuous PARTS LOOP for temporary storage of parts. New parts may be added to the PARTS LOOP from input conveyor 60, which in turn is fed from a storage warehouse area 250 consisting of a plurality of storage conveyors 255 each storing a different type of basic or raw part.

Conveyors 255, as well as conveyor 60, may be formed by freely rotatably rollers which gravity feed a part towards an output point blocked by an electrically actuable gate 257. Upon actuation, the gate 257 rises to release an individual part and its pallet to conveyor 40 via conveyor 60. In order to simplify the computer program, it is desirable that each individual feed conveyor 255 in the first warehouse area 250 store the same type of part 25 thereon. As many individual conveyors 255 may be provided as there are basic parts which are to be machined.

Computer 30 records the instantaneous identity and location of all parts in the system, as will be later described in detail with reference to FIGS. 13 and 14. Briefly, the original location and the process number of each part are stored in the memory of the computer. By means of part sensing stations, such as photoelectric circuits 134, spaced along the conveyor at various checking points, the location of each process number in the computer memory may be continuously shifted in synchronism with the passage of parts in the system. At each location where parts (or tools) may be added or removed from a conveyor, a photoelectric circuit checking station is associated therewith in order to signal the successful addition or removal of the part and the exact time at which it occurs, in order that the corresponding process number be added or removed from the portion of the computer memory associated with that conveyor.

For example, when NCMT-B is to run a particular program, computer 30 determines the process number of the part which is to be machined and searches its memory to determine the location of the closest such part in the system. Should the desired part be located on PARTS LOOP 1, computer 30 will allow the part to circulate around the loop until it passes the photoelectric circuit 134 associated with the pneumatic cylinder 44 for NCMT-B, at which time cylinder 44 will be actuated to eject the part onto the input station 70 for the machine tool. If the desired part is not located on PARTS LOOP 1, computer 30 will actuate gate 257 associated with the conveyor 255 which stores the part, in order to release the same into the system.

Should a machine tool associated with PARTS LOOP N need a particular part circulating on PARTS LOOP 1, computer 30 will cause the part to be ejected onto outgoing conveyor 61 connected with PARTS LOOP N. If the needed part should not exist anywhere in the system, computer 30 will select the program which machines the part, and will cause the raw part necessary for this program to be conveyed to a machine tool in PARTS LOOP 1. After the part is machined, it will be ejected and conveyed to the desired machine tool in PARTS LOOP N.

Tools 81 (see FIGS. 10—12) used by two or more machine tools are individually stored in shuttle cars 83 continuously circulated by conveyor 80 around a TOOLS LOOP for the machine tools. Although TOOLS LOOP 1 is illustrated as servicing the same group of machine tools as serviced by PARTS LOOP 1, such is not necessary, and a TOOLS LOOP may service more or less machine tools than are included in any given PARTS LOOP.

The tools necessary during the running of a given program at a selected machine tool are shunted onto a temporary side track 85, FIG. 8, which services an automatic tool changer 87 for that machine tool. In addition to the tools used in common by the machine tools, it may be desirable to permanently store a number of tools at each machine tool station. For this purpose, a permanent storage tool drum 269 is associated with each machine tool in the system. Tool changer 87 transports a selected tool from either its fixed storage area 269 or temporary storage area 85 to spindle head 23. When the tool is to be replaced, tool changer 87 removes and returns the same to its original storage location, and thereafter selects another tool from either the fixed or temporary storage areas.

The instantaneous location and identity, in the form of a tool number, of each tool in the system is recorded in the memory of computer 30, in a manner similar to that previously described for parts 25. Photoelectric circuits 134 are located at each intersection where tools may be added to, or removed from, the TOOLS LOOP. By means of these photoelectric circuits, computer 30 is able to continuously identify and locate all tools in the system, whether located on conveyor 80, on a particular side track 85, or at fixed drum storage 269.

In FIG. 9, a schematic diagram of the plural machine tools and parts and tools handling system of FIGS. 8—14 is illustrated. A PARTS LOOP storage area 270, representative of all PARTS LOOPS 1 through N, provide temporary storage of parts. Similarly, the TOOLS LOOP storage area 271, representative of all of the TOOLS LOOPs of FIG. 8, provide a common storage area for the tools used by each of the machine tools.

Because computer 30 maintains a continuous record of the location and identity of all parts and tools in the system, the PART IDENTIFY line 210 and PART REIDENTIFY line 216 of FIGS. 5 and 7, as well as the read and write units associated therewith have been completely eliminated. In their place, a PARTS DATA line 273, coupled to the various photoelectric circuits 134 of FIG. 8 provide input data information as to when parts pass reference or checking positions. This information is used to switch the last previously known location of an identified part to a new location in synchronism with their movement in the system. Whenever a part is machined into a new part, the computer changes the process number recorded in its memory, thus eliminating the necessity for any PART REIDENTIFY line.

In a manner similar to parts, a TOOLS DATA line 274 is coupled with the photoelectric circuits 134 of FIG. 8 associated with the various tools storage areas. The input information on line 274 serves to switch the location of identified tools to different corresponding positions in the memory of computer 30.

Each machine tool station includes provisions for sensing the occurrence of a condition which requires correction and transmission of this information to the computer. As example of one such condition is the error sensor 276 which is coupled to computer 30 through an ERROR SIGNAL line 277. Upon the occurrence of a tool break, or an excessive temperature, or other error monitored by sensor 276, computer 30 switches control of the machine tool to a special subroutine, described in detail with reference to FIG. 14. Briefly, the subroutine causes the remainder of the program for controlling the machine tool to be run, if the part is not damaged, at the same machine tool after correction of the error, or at a different machine tool should the machine tool at which the error occurred be damaged.

Tool Handling System

The detailed structure of the temporary and fixed tool storage areas for a single machine tool station is illustrated in FIGS. 10—12. Each shuttle car 83 has a cylindrical center aperture 278, FIGS. 11 and 12, into which is inserted the shank 279 of an individual tool 81, thereby removably holding each tool in an upright position.

Conveyor 80 has a pair of tracks 280, FIG. 10, for guiding slotted wheels 282 rotatably mounted on shuttle cars 83. The shuttle cars are pushed around tracks 280 by a continuously driven conveyor mechanism (not illustrated) mounted between tracks 280, and having a plurality of vertical arms 284 extending upward therefrom at spaced locations throughout the length of conveyor 80. Each vertical arm 284 has a transverse arm 285 extending forwardly therefrom in the direction of motion of the conveyor, which bears against the back one of a pair of plates 287 carried on the shuttle cars 83. It should be noted that two plates 287 are necessary on each shuttle car 83, since the shuttle car is turned 180° each time it returns to conveyor 80 from a side track 85. While a unidirectional conveyor 80 will be described in detail, the conveyor may be bidirectional, for reasons discussed hereinafter. In such a case, additional vertical arms and the like would be provided for propelling the shuttle cars 83 in the opposite direction.

Each side track 85 includes a pair of tracks 300 for guiding slotted wheels 302 mounted on the front and back portions of each shuttle car 83. When a shuttle car 83 is to be shunted onto side track 85, a pneumatic cylinder 305 is actuated to extend a pair of half tracks 306, FIG. 11, transversely across conveyor 80, through vertical slots in tracks 280. The front top portion 310 of the half tracks 306 is tapered to cause wheels 302 to ride upwardly onto the top most portion 311 of half tracks 306, lifting slotted wheels 282 completely off tracks 280.

At the end of the stroke of cylinder 305, an ear 315, FIG. 11, projecting from one half track 306, is driven through a slot in track 280 and into engagement with the bottom portion 317 of a lever 318 pivotally secured to a base 319. The ear 315 forces lever 318 to quickly pivot about base 319, driving a top portion 321 of lever 318 against shuttle car 83 to impart an impulse thereto. The car rolls on wheels 302 across half tracks 306 and onto tracks 300 of side track 85. Transverse arm 285 bears against a portion of plate 287 which extends above the path of wheels 302, in order that wheels 302 will clear transverse arm 285 when riding across half tracks 306.

Side tracks 300, FIG. 10, slope downwardly throughout their length, in order to gravity feed the shuttle cars around the side track and back toward an exit station leading onto conveyor 80. Tracks 280 dip downwardly near each exit in order to match the horizontal level of the side track exit station, and thereafter rise upwardly to their former level.

At the side track exit station, a pneumatic cylinder 330 and associated pair of half tracks 332, similar to cylinder 305 and half tracks 306 respectively, deposit the shuttle cars 83 back onto tracks 280 of conveyor 80. However, unlike half tracks 306, the half trucks 332 slide across conveyor 80 at a somewhat higher horizontal plane than tracks 280 (while still maintaining a downward slope), and retrack in a lower horizontal plane in order to lower wheels 282 onto tracks 280. An electric actuable gate 230, which prevents a shuttle car from reentering conveyor 80 should a shuttle car on conveyor 80 be approaching the intersection, is connected in a circuit to block the actuation of cylinder 330 when gate 230 is lowered. If desired, conveyor 80 may be bidirectional, for returning a released shuttle car back to the same or a preceding side track station. Such bidirectional operation forms subloops at one or more side track stations, localizing the movement of tools and eliminating the necessity that the tools be conveyed through the total TOOLS LOOP. Conveyor motion in such a reverse direction, as indicated by the dashed arrow in FIG. 10, may be initiated under control of computer 30. When bidirectional motion is provided, additional photoelectric circuits should be located as illustrated in FIG. 10, on both sides of the intersection of two or more tools conveyors, in order that the arrival of a tool travelling in either direction may be signalled to the computer for control purposes.

All tools necessary during the running of a program are assembled at the machine tool station before the program is started, or during the running of the program prior to their being needed. As the computer determines from its memory that a needed tool is directly adjacent the half tracks 306 associated with the machine tool at which the program is to run, or is being run, the pneumatic cylinder 305 associated therewith is energized. Since it is not necessary that the tools be assembled on side track 85 in the order in which they will be used, they may be removed from conveyor 80 in the shortest possible time, whenever a needed tool passes adjacent the entry station.

As seen in FIG. 10, the first shuttle car removed from conveyor 80 rolls along tracks 300 by force of gravity until it strikes legs 340 of a U-shaped member 342 having a hollow center portion 344. Member 342 is driven parallel along tracks 300 by an electric motor 350 coupled through a drive mechanism 352 to an outwardly extending leg 354 of the member 342. Drive mechanism 352 consists of a worm screw 360 rotated by motor 350 and meshed with an internally threaded nut 362 extending through leg 354. A rod 364 fixedly secured to leg 354, and slidably held within a bushing 365, serves to stabilize member 342 as it is driven along the length of worm screw 360.

Automatic tool changer 87 has a Y-shaped end claw 380, FIG. 10, movable longitudinally toward a tool positioned directly in front thereof. As seen in FIG. 12, claw 380 grasps the shank 279 of the tool, and thereafter lifts the tool upwardly to remove the tool from its cylindrical holder 278 in shuttle car 83. In order to prevent shuttle car 83 from being derailed when a tool 81 is being removed therefrom, a bracket 385, attached to rail 85, has an upper portion 386 which extends horizontally over one set of wheels 302 of the shuttle car 83, to hold the wheels on the tracks.

Computer 30 controls the operation of motor 350, FIG. 10, in order to position the shuttle car 83 which carries a desired tool directly in front of tool changer arm 87. When the shuttle car is located in the proper position, the computer causes claw 380 to be extended in order to remove the tool from the shuttle car. Thereafter, the automatic tool changer places the tool in the spindle head of the machine tool in a conventional manner.

At the completion of the machining operations, claw 380 again grasps the shank of the tool, removes it from the spindle head, and replaces it back in cylindrical holder 278 in its shuttle car. As claw 380 is withdrawn form its position around the shank of the tool, the computer energizes motor 350 and drives member 342 to the proper direction for positioning the shuttle car 83 having the next tool in front of the tool changer. When the last tool used in the machining operation has been replaced in its shuttle car, member 342 is driven to the extreme left-hand position as illustrated in FIG. 10, moving the member out of the path of side track 85 in order to allow all of the shuttle cars 83 to roll downwardly to the exit station for return to conveyor 80.

Some tools 81, commonly used at a particular machine tool station, or special purpose tools, are stored in the fixed tool storage drum 269, rather than on the shuttle cars 83. As seen in FIG. 12, drum 269 is located in a horizontal plane below the plane of the temporary tool storage side track 85. Drum 269 has a plurality of cylindrical apertures 400 spaced circumferentially therearound. Tool holders 401, having hollow cylindrical center sections 402 for removably holding the shank 279 of tools 81, rest on shoulders 403 within each aperture 400 of drum 269. As viewed from left to right in FIG. 12, tool holders 401 hold a milling tool, a tap, and a small drill (while the shuttle car 83 holds a large drill).

Drum 269 is secured to a large gear 407 having a stub extending downwardly therefrom which is movably received within a bearing 408 on a base 409. Gear 407 meshes with a gear 412 secured to the shaft of an electric motor 414 for rotating drum 269 in order to position a desired tool in direct vertical alignment with the automatic tool changer position.

When a tool 81 is to be removed from drum 269, computer 30 actuates motor 414 until the desired tool is located directly under and in vertical alignment with the extended position of claw 380. At that time, motor 414 is braked and motor 350, FIG. 10, is actuated to drive member 342 until its center aperture 344 is located in direct vertical alignment over the desired tool on drum 269. When both member 342 and drum 269 are in the proper positions, pneumatic cylinder 420 is actuated to raise the desired tool and tool holder to the proper position for removal of the tool by tool changer 87.

More particularly, cylinder 420, FIG. 12 drives a rod 422 with a gripping head 423 thereon through cylindrical aperture 400 in drum 269 and into abutment with tool holder 401. Gripping head 423 snaps into position within slots 425 in tool holder 401, in order to lock the tool holder to rod 422 as it continues to be driven vertically upward. Tool holder 401 is driven through aperture 344 in member 342, and continues upward until the tool held therein is at the same vertical level illustrated for tool 81 on shuttle car 83. At this time, the arm of tool changer 87 is extended until claw 380 grasps the shank 279 of the tool carried by tool holder 401. The tool is thereafter removed, and eventually replaced after a machining operation, in the same manner as previously described for tools carried by shuttle cars 83. Pneumatic cylinder 420 is then deactuated to lower tool holder 401 to a rest position within aperture 400 of drum 269. Computer 30 may now control the selection of another tool from either shuttle car 83 or from fixed tool storage drum 269.

Computer Program

Figure 13:
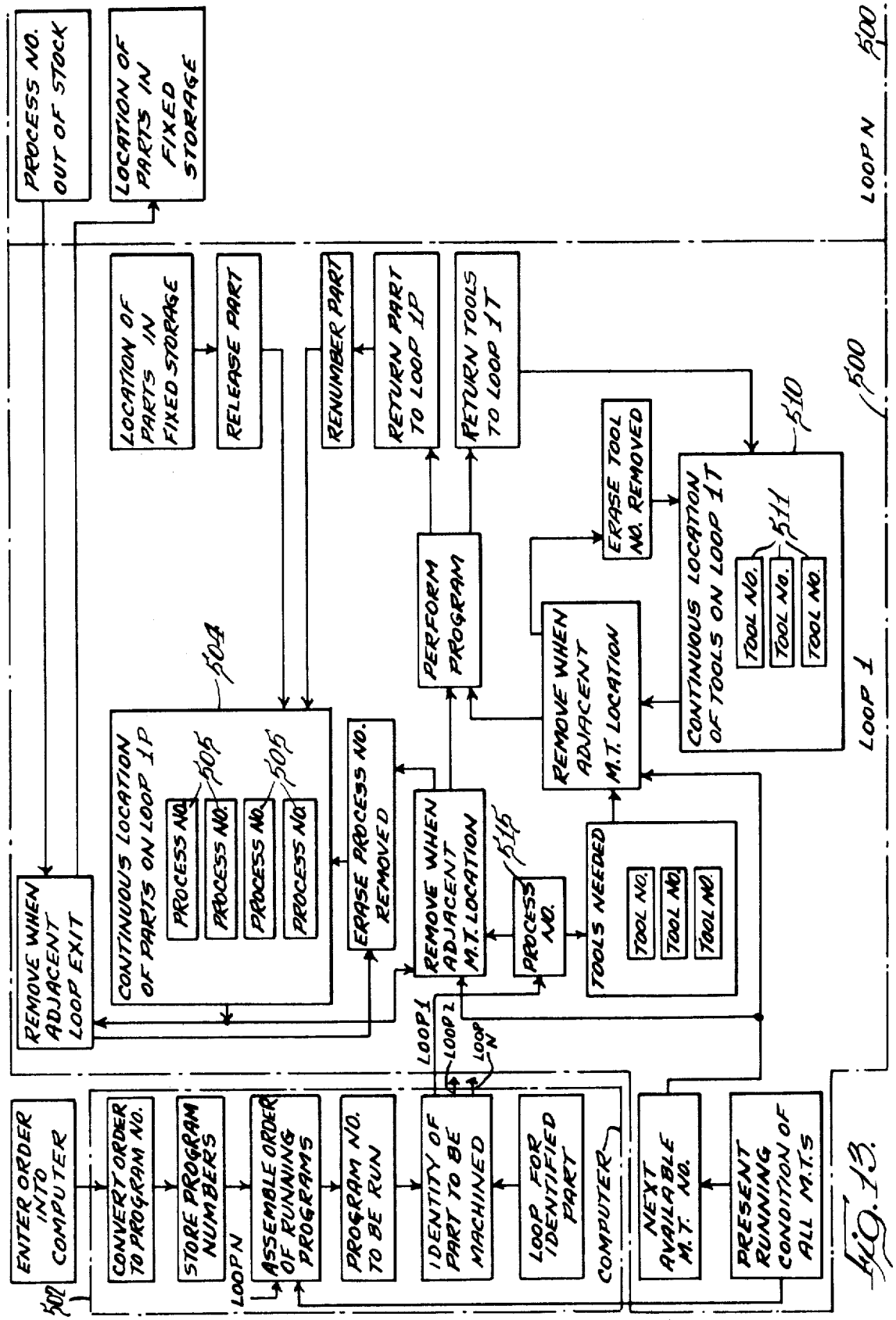
FIG. 13 is a flow diagram of a master control program for the on-line computer of FIG. 8.

In FIG. 13, a flow diagram of a portion of the master control program for on-line computer 30 of FIG. 8 is illustrated. A separate portion 500 of the master program, illustrated within the dashed lines, is devoted to control processes for each group of machine tools associated with a PARTS and a TOOLS LOOP. For simplification, only the control processes for PARTS LOOP 1 (identified as loop 1P) and TOOLS LOOP 1 (identified as loop 1T) have been illustrated in detail, as representative of the control processes associated with each group of machine tools. A separate portion 502 of the program is devoted to the control processes common to all machine tools in the system.

Associated with each portion 500 of the master program for processes associated with a group of machine tools, an area 504 of the computer memory is set aside to record the continuous location of the parts in the loop. Within area 504, a separately addressed area or block 505 is associated with each possible location of a part in the loop, for storing the process number of a part when positioned at that location. Initially, the process number for each part is entered into the address block 505 associated with the instantaneous location of the part. As the part is conveyed around the loop, the process number identifying the part is stepped, in synchronism with the movement of the part, into different address blocks 505 associated with its locations in order to keep track of the instantaneous location of the part.

In order to record the instantaneous location and identity of tools in the loop, a separate area 510 similar to area 504 for parts, is set aside for each tool loop. Separate address blocks 511, similar to address blocks 505 for parts, store the tool number of a tool positioned at the location associated with an individual address block.

When an order for a part is received, the order number is entered into the computer at the upper most left-hand block illustrated in FIG. 13. The order number is converted into a program number which identifies a program for machining a raw part into the final desired product. All of the program numbers entered during a given period of time are stored, and thereafter the optimum order in which to run the programs is determined. When assembling the order of running the programs, the present running condition of all machine tools in each loop is considered. After the order of running the programs has been determined, the program number of the next program which is to be run, as well as the identity of the next available machine tool at which that program will be run, are determined.

Each program number represents an address in the computer memory at which the program is stored. In response to the determination of the next program number, the computer searches its memory to find the program. The beginning portion of the program stores the process number of the raw part which is to be machined into the desired final product. The process number of the raw part is switched to a storage unit 515 located within area 500 of the loop at which the raw part is located.

The process number stored in unit 515 is continuously compared with the process number stored in the particular address unit 505 associated with the location of the part input station for the selected machine tool. When the process numbers match, indicating that the desired part is located adjacent the selected machine tool location, the part is removed from the loop and conveyed to the machine tool. As the part is removed from the loop, the process number corresponding thereto is erased from area 504 and is inserted into a memory (not illustrated) which identifies parts located at the selected machine tool station.

Should the desired raw part not be stored on a PARTS LOOP, the process number of parts located in the fixed storage area is compared with the desired process number. If a match is found, the part is released from fixed storage into the PARTS LOOP, and the process number corresponding thereto is inserted in the proper address block 505 associated with the input station for parts entering the LOOP. This part is then circulated around the LOOP until adjacent the machine tool station, at which time a match is indicated in the same manner as previously described for parts located on the LOOP.

The process number stored in unit 515 also identifies a tools memory address which stores the tool numbers of all tools needed in the machining operations for the selected program.

The tool number stored in the address block 511 associated with the temporary tool storage entry station for the desired machine tool is continuously compared with all of the needed tool numbers. Each time a match occurs, the tool adjacent the entry station is removed from the TOOLS LOOP and is conveyed to the temporary tool storage area for that machine tool. The tool numbers of the removed tools are erased from area 510, and are inserted into a memory (not illustrated) which stores the identity and order of all tools at the temporary storage area adjacent the selected machine tool.

When the part and all of the tools have been removed from their storage areas and conveyed to the machine tool location, the program identified by the process number stored in unit 515 is run. The computer couples the data link for the selected machine tool to the memory storing the selected program in order to control the operation of the machine tool. Each control program consists of blocks of binary coded control instructions representative of the direction and amount of servo movement for each axis of the machine tool. Such information is similar to the output of conventional tape readers for numerically controlled machine tools. In effect, the computer memory is a substitute for the memory function performed by conventional control tape.

At the completion of the program, the machined part and the tools are returned to their respective storage areas. As each tool returns to its LOOP, the tool number corresponding thereto is entered into the address block 511 associated with the tools exit station for the machine tool. Since the part has been converted by the machining operations into a new part, it is renumbered, and the new process number is inserted in the address block 505 corresponding to the reentry location for parts from the machine tool. The next program may now be run.

In some instances, a raw part may have to be machined at one loop in order to provide the basic part needed for further machining operations at a later loop. For example, to run a particular program at LOOP N, a search for the process number of the part to be machined may determine that no such part is located in either the temporary nor the fixed storage areas associated with that loop. In such a case, the process number which is out-of-stock will be compared with process numbers of parts in LOOP 1P. If a match is found, the part is removed from the LOOP 1P and is conveyed to the fixed storage area for LOOP N. Should no match be found in any loop at which the part may be located, the computer identifies the program which will form that part, and conveys the raw part necessary for that program to a machine tool. Thereafter, the identified program is run in order to machine the part needed for LOOP N.

Error Subroutine Program

During the running of a program, a tool may break, or a different type of condition or error such as excessive temperature may occur, which requires special attention. Upon the sensing of such a condition, the running of the normal program is interrupted, and the machine tool is placed under control of a special or modified program or subroutine, as illustrated in FIG. 14.

More particularly, when an error is sensed by sensor 276 of FIG. 9, the program being run is stopped, and the uncompleted portion of the program is shifted into a temporary storage memory. At the same time, the part which was being machined is returned to the PARTS LOOP. As this part passes adjacent a checking station (not illustrated), it is removed from the PARTS LOOP, and is checked for any damage which may have resulted due to the error. If the checking station finds the part has been damaged, the part is rejected, and the temporarily stored uncompleted program portion is erased. If the part has not been damaged, it is returned to the PARTS LOOP.

At the same time, the machine tool at which the error occurred is checked to determine whether the error has been corrected. If the error involved an excess temperature, for example, the temperature of the machine tool would be checked after a predetermined time lapse sufficient for any temporary temperature transient to have disappeared. Or, if the error was due to the breaking of a tool, the tool would be replaced with another identical tool conveyed from the TOOLS LOOP.

If the machine is found to be undamaged and in condition for further machining operations, an OK output signal causes the partially machined part to be removed from the PARTS LOOP when adjacent the same machine tool at which the error occurred. The temporarily stored uncompleted program is then unloaded into the same PERFORM PROGRAM block of FIG. 13 in which it had been running, and the program is continued.

However, should a check of the machine tool indicate that damage has occurred, a NOT OK output signal causes the partially machined part to be removed when adjacent a new machine tool station, and also alerts an operator that the machine tool must be repaired. The temporarily stored uncompleted program is then unloaded to the PERFORM PROGRAM block for the new machine tool station at which the part is now located. Thereafter, the program is continued, allowing the new machine tool to complete the machining operations on the part.

We claim:

1. A control system for controlling a plurality of machine tools capable of selectively performing similar or different machining operations on parts delivered to said machine tools, which parts may be the same or different and each of which has a process indicia associated therewith, comprising:

means for delivering parts to the machine tools;
a central source of programs for controlling machining operations at all of the machine tools;
control means responsive to a process indicia for coupling to each machine tool the program from said central source which controls the machining operation to be performed on a part delivered to that machine tool and which part is identified by said process indicia;
part identification means for identifying the process indicia of a part, including a record medium carried along with said part and forming said process indicia, and a read unit associated with at least one machine tool and responsive to the record medium for identifying said process indicia represented thereby;
said control means including at least one data link connectable between said central program source and each of said machine tools for coupling programs to the machine tools associated therewith, and means for connecting the program identified by the process indicia to the data link for the machine tool at which the part is located; and
a write unit associated with each machine tool for assigning a new process indicia to the part after a machining operation has been performed on the part associated therewith.

2. A control system for controlling a plurality of machine tools capable of selectively performing similar or different machining operations on parts delivered to said machine tools, which parts may be the same or different and each of which has a process indicia associated therewith, comprising:

a central source of programs for controlling machining operations at all of the machine tools;
control means responsive to a process indicia for coupling to each machine tool the program from said central source which controls the machining operation to be performed on a part delivered to that machine tool and which part is identified by said process indicia;
part identification means for identifying the process indicia of a part;
said control means including at least one data link connectable between said central program source and each of said machine tools for coupling programs to the machine tools associated therewith, and means for connecting the program identified by the process indicia to the data link for the machine tool at which the part is located;
means for indicating that a machine tool is in condition for receiving a new part; and
means for delivering parts to the machine tools including converting means responsive to said indicating means for randomly transporting a part from a part supply location to the machine tool at which said condition has occurred.

3. A control system for controlling a plurality of machine tools capable of selectively performing similar or different machining operations on parts delivered to said machine tools, which parts may be the same or different and each of which has a process indicia associated therewith, comprising:

means for delivering parts to the machine tools;
a central source of programs for controlling machining operations at all of the machine tools;
control means responsive to a process indicia for coupling to each machine tool the program from said central source which controls the machining operation to be performed on a part delivered to that machine tool and which part is identified by said process indicia; and
reidentification means for assigning to a part which has completed a machining operation a new process indicia which reidentifies the part.

4. A control system for controlling a plurality of machine tools capable of selectively performing similar or different machining operations on parts delivered to said machine tools, which parts may be the same or different and each of which has a process indicia associated therewith, comprising:

means for delivering parts to the machine tools;
a central source of programs for controlling machining operations at all of the machine tools;
control means responsive to a process indicia for coupling to each machine tool the program from said central source which controls the machining operation to be performed on a part delivered to that machine tool and which part is identified by said process indicia;
means for sensing at one of said machine tools the occurrence of a condition which requires correction, and
means responsive to the sensed occurrence of a condition which requires correction for stopping the running of a program coupled from said central source to the machine tool at which the condition occurred.

5. The control system of claim 4 including means responsive to the sensed occurrence of a condition which requires correction for retaining at least the remaining portion of the stopped program,
means for placing said system in condition for continuing machining operations on said part, and
means for running said remaining portion of said stopped program on said part in order to complete the machining operations thereon.

6. A control system for controlling a plurality of machine tools capable of selectively performing similar or different machining operations on parts delivered to said machine tools, which parts may be the same or different and each of which has a process indicia associated therewith, comprising:

means for delivering parts to the machine tools;
a central source of programs for controlling machining operations at all of the machine tools;
control means responsive to a process indicia for coupling to each machine tool the program from said central source which controls the machining operation to be performed on a part delivered to that machine tool and which part is identified by said process indicia;
a central supply of tools for use by more than one of said plurality of machine tools;
means for identifying the tools which will be necessary for performing the machining operations controlled by a given program at a selected one of said plurality of machine tools; and
means responsive to said identifying means for causing the identified tools to be conveyed from said central supply of tools to said selected one machine tool.

7. A control system for controlling a plurality of machine tools some of which are capable of performing similar machining operations on a part, comprising:

a computer having a program memory for storing a plurality of different programs, each program being capable of controlling more than one of said plurality of machine tools to produce the same series of machining operations on a part, wherein each part is assigned a process indicia which identifies the part, and said computer has a parts location memory for storing the process indicia which identifies each part in the system;

a plurality of data links for coupling said computer to each of said plurality of machine tools in order to transmit a program stored in said program memory to any one of said plurality of machine tools;

a central supply of parts on which similar and different series of machining operations are to be performed by any one of said plurality of machine tools;

means for conveying a part from said central supply to one of said plurality of machine tools;

means for generating a signal which identifies the series of machining operations which are to be performed on said conveyed part;

means for selecting the program stored in said program memory which controls the same series of machining operations as identified by the signal from said generating means and for transmitting said last named program over the data link connected to the machine tool to which said part has been conveyed;

sensing means for recording the passage of parts past predetermined locations along said conveying means; and said computer is responsive to said sensing means for continuously updating the location of process indicia in said parts location memory in order that the location of process indicia in said parts location memory corresponds with the instantaneous location of the parts along said conveying means.

8. The control system of claim 7 wherein said sensing means are located at branch positions along said conveying means at which a part can take one of a plurality of paths.

9. A control system for controlling a plurality of machine tools some of which are capable of performing similar machining operations on a part, comprising:

a computer having a program memory for storing a plurality of different programs, each program being capable of controlling more than one of said plurality of machine tools to produce the same series of machining operations on a part, wherein each part is assigned a process indicia which identifies the part, and said computer has a parts location memory for storing the process indicia which identifies each part in the system;

a plurality of data links for coupling said computer to each of said plurality of machine tools in order to transmit a program stored in said program memory to any one of said plurality of machine tools;

a central supply of parts on which similar and different series of machining operations are to be performed by any one of said plurality of machine tools;

means for conveying a part from said central supply to one of said plurality of machine tools;

means for generating a signal which identifies the series of machining operations which are to be performed on said conveyed part;

means for selecting the program stored in said memory which controls the same series of machining operations as identified by the signal from said generating means and for transmitting said last named program over the data link connected to the machine tool to which said part has been conveyed;

reidentification means responsive to the completion of a machining operation for assigning to a machined part a new process indicia representative thereof; and means for substituting said new process indicia for the previous process indicia stored in the parts location memory.

10. A control system for controlling a plurality of machine tools some of which are capable of performing similar machining operations on a part, comprising:

a computer having a memory for storing a plurality of different programs, each program being capable of controlling more than one of said plurality of machine tools to produce the same series of machining operations on a part;

a plurality of data links for coupling said computer to each of said plurality of machine tools in order to transmit a program stored in said memory to any one of said plurality of machine tools;

a central supply of parts on which similar and different series of machining operations are to be performed by any one of said plurality of machine tools;

means for conveying a part from said central supply to one of said plurality of machine tools;

means for generating a signal which identifies the series of machining operations which are to be performed on said conveyed part;

means for selecting the program stored in said memory which controls the same series of machining operations as identified by the signal from said generating means and for transmitting said last named program over the data link connected to the machine tool to which said part has been conveyed;

means for sensing at one of said machine tools the occurrence of a condition which requires correction; and means responsive to the sensed occurrence of a condition which requires correction for stopping the running of a program coupled from said computer to the machine tool at which the condition occurred.

11. A control system for controlling a plurality of machine tools some of which are capable of performing similar machining operations on a part, comprising:

a computer having a memory for storing a plurality of different programs, each program being capable of controlling more than one of said plurality of machine tools to produce the same series of machining operations on a part;

a plurality of data links for coupling said computer to each of said plurality of machine tools in order to transmit a program stored in said memory to any one of said plurality of machine tools;

a central supply of parts on which similar and different series of machining operations are to be performed by any one of said plurality of machine tools;

means for conveying a part from said central supply to one of said plurality of machine tools;

means for generating a signal which identifies the series of machining operations which are to be performed on said conveyed part;

means for selecting the program stored in said memory which controls the same series of machining operations as identified by the signal from said generating means and for transmitting said last named program over the data link connected to the machine tool to which said part has been conveyed;

a central supply of tools for use by more than one of said plurality of machine tools;

means for identifying the tools which will be necessary for performing the machining operations controlled by a given program at a selected one of said plurality of machine tools; and means responsive to said identifying means for causing the identified tools to be conveyed from said central supply of tools to said selected one machine tool.

12. A control system for controlling a plurality of machine tools each using a plurality of tools for performing different machining operations on a part, comprising:

a central supply of tools for use by more than one of said plurality of machine tools;

conveying means for transporting tools from said central supply to any of said machine tools;

means for identifying at least some of the tools which will be necessary for performing a series of machining operations at one of said plurality of machine tools; and control means responsive to the identifying means for causing said conveying means to transport the identified tools from said central supply to said one machine tool.

13. The control system of claim 12 including a plurality of tool carriers each carrying a single tool therein, means located adjacent each machine tool for temporarily storing tools which are to be used in machining a part, a loop conveyor for circulating said tool carriers adjacent the temporary storing means at each of said machine tools, said control means causing the individual tool carriers which carry identified tools to be shunted from said loop conveyor to the temporary storing means associated with the machine tool at which the series of machining operations is to be performed.

14. The control system of claim 13 wherein each of said machine tools includes an automatic tool changer positioned to remove a single tool from its tool carrier and place the same in position in said machine tool and thereafter replace said tool back into the same tool carrier before removing the next tool from its tool carrier.

15. The control system of claim 12 wherein each of said tools is assigned a tool indicia which identifies the tool, and a central computer with a tools location memory for storing the tool indicia which identify each tool in the system.

16. The control system of claim 15 including sensing means for recording the passage of parts and tools past predetermined locations, and said computer has a parts location memory for storing process indicia which identifies each part, said computer being responsive to said sensing means for continuously updating the location of process indicia and tool indicia in said parts location memory and said tools location memory respectively in order that the location of process indicia and tool indicia in said parts location memory and said tools location memory respectively corresponds with the instantaneous location of the parts and tools in the system.

17. The control system of claim 12 including a fixed location supply of tools for use by a particular one machine tool to supplement tools from said central supply, said identifying means identifying tools located in both said central supply and said fixed location supply which are necessary for performing a series of machining operations at said particular one machine tool, and tool changer means associated with said particular one machine tool and responsive to said identifying means for individually selecting and transporting tools from both said conveying means and said fixed location supply to said particular one machine tool.

18. A control system for controlling a plurality of machine tools capable of selectively performing similar or different machining operations on parts delivered to said machine tools, which parts may be the same or different and each of which has a process indicia associated therewith, comprising:

conveying means for transporting a part from a part supply location to individual supply locations for each of said plurality of machine tools, including eject means located at one of said individual supply locations and actuable to deliver a part adjacent thereto to a particular machine tool;

a programmable computer forming a central source of programs for controlling machining operations at the machine tools, including a recirculating memory for continuously recording the location and identity of parts being transported by said conveying means, and means for selecting a part as identified by a particular process indicia for delivery to said particular machine tool; and control means for actuating said eject means when said particular process indicia is located in said recirculating memory at the individual supply location adjacent said eject means.

Notice of Adverse Decision in Interference

In Interference No. 98,192, involving Patent No. 3,576,540, D. G. Fair, H. L. Beaverstad and C. F. Erikson, PLURAL MACHINE TOOL AND PART HANDLING CONTROL SYSTEM, final judgment adverse to the patentees was rendered Apr. 4, 1977, as to claims 2 and 7.

[*Official Gazette September 20, 1977.*]

Notice of Adverse Decision in Interference

In Interference No. 98,193, involving Patent No. 3,576,540, D. G. Fair, H. L. Beaverstad and C. F. Erikson, PLURAL MACHINE TOOL AND PART HANDLING CONTROL SYSTEM, final judgment adverse to the patentees was rendered Apr. 4, 1977, as to claims 6, 11, 12, 15 and 16.

[*Official Gazette September 20, 1977.*]